2,794,010
Patented May 28, 1957

2,794,010

POLYMERIC BLENDS OF A WATER-INSOLUBLE, WATER - DISPERSIBLE, NON - ELECTROLYTE FILM-FORMING POLYMER AND A WATER-SOLUBLE, ANIONIC POLYELECTROLYTE EPOXY POLYMER AND PREPARATION OF SHAPED ARTICLES THEREFROM

Harold L. Jackson, Wilmington, Del., assignor to E. I. du Pont de Nemours and Company, Wilmington, Del., a corporation of Delaware No Drawing. Application June 26, 1953,
Serial No. 364,487

21 Claims. (Cl. 260—45.5)

This invention relates to new polymeric compositions, to their preparation, and to methods for preparing shaped articles therefrom. More particularly, this invention relates to new polymer blends comprising polymers of a special type capable of being readily crosslinked, and to methods for preparing shaped articles from such polymer blends.

This application is a continuation-in-part of my copending application Ser. No. 337,671, filed February 18, 1953.

The terms "crosslinked polymers" and "crosslinking" are used herein in their usual and accepted meaning in polymer chemistry (see, for example, Ellis, "The Chemistry of Synthetic Resins," Reinhold Publishing Corp., 1935, at pages 59–62; Gilman, "Organic Chemistry," John Wiley and Sons, 1943, vol. I, chapter on Synthetic Polymers by Marvel and Horning, particularly at pages 703, 720, and 750; Schildknecht, "Vinyl and Related Polymers," John Wiley and Sons, 1952, particularly at pages 68–81 and 208–211). Likewise, the term "covalent linkage" has its usual meaning (see, for instance, in Gilman's "Organic Chemistry," already referred to, vol. II, the chapter on Modern Electronic Concepts of Valence, by J. R. Johnson, particularly at pages 1825–1827). The term "polyelectrolyte polymer," which is frequently used in polymer chemistry (see, e. g., Schildknecht, referred to above) signifies, of course, a polymer containing a plurality of ionic groups.

It has been found that films from polyelectrolyte polymers, particularly those from polyanionic polymers, have the advantageous property of being highly permeable to moisture. However, polyelectrolyte polymers in general give films which suffer from the disadvantages of low wet strength, poor dimensional stability and brittleness at low relative humidity.

It is an object of this invention to provide new polymeric compositions, methods for their preparation and a process for preparing shaped articles from the new polymeric compositions. A further object is to provide new polymer blends comprising polymers capable of being readily crosslinked and which have desirable film-forming properties. A still further object is to provide new polymer blends comprising polyelectrolyte polymers, which polymer blends are film-forming materials and retain the moisture permeability of polyelectrolyte polymers but are dimensionally stable and exhibit improved toughness and pliability at low relative humidity. Another object is to provide a process for preparing shaped articles from the novel polymer blends, which shaped articles are dimensionally stable and have a high moisture permeability. Other objects will appear hereinafter.

These and other objects of this invention are accomplished by providing polymer blends composed of a water-insoluble, water-dispersible, non-electrolyte, film-forming addition polymer of a polymerizable ethylenically unsaturated monomer having a terminal carbon-to-carbon double bond and a water-soluble anionic polyelectrolyte polymer in a weight ratio in the range of 50:50 to 97:3, said anionic polyelectrolyte polymer containing at least 0.2 acidic (anionic) group per 100 molecular weight and also containing oxirane, i. e., 1,2-epoxy groups, the molar ratio of acidic groups to oxirane, i. e., 1,2-epoxy groups, being at least 1:1.

The new polymer blends of this invention contain oxirane or 1,2-epoxy groups, that is, groups of the formula

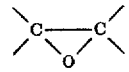

The term "epoxy" will be used throughout this application to designate this 1,2-epoxy, or oxirane, group. Because of the presence of these groups, which are known to open readily, for example, under the influence of heat, these polymer blends are readily capable of covalent crosslinking, and thus of giving shaped polymeric structures resistant to water and organic solvents. They also contain anionic, or acidic, groups; these terms referring, of course, to groups ionizable in aqueous solution with the production of hydrogen ions, typical representatives of which are the carboxyl, —COOH; sulfonic, —SO₃H; and phosphoric, —PO₄H₂, groups. It should be understood that these terms include the alkali metal or ammonium salts of the acid radicals.

This invention also includes a process of preparing shaped articles which comprises the steps of dissolving a water-soluble anionic polyelectrolyte polymer containing epoxy groups and capable of cross-linking by self-reaction on heating in an aqueous dispersion of a water-insoluble non-electrolyte film-forming addition polymer of a polymerizable ethylenically unsaturated monomer having a terminal carbon-to-carbon double bond, said water-soluble anionic polyelectrolyte polymer containing at least 0.2 acidic group per 100 molecular weight, the molar ratio of acidic groups to epoxy groups being at least 1:1 and the weight ratio of said water-insoluble non-electrolyte, film-forming polymer to said water-soluble anionic polyelectrolyte polymer being in the range of 50:50 to 97:3, forming the resultant polymeric blend into a shaped article, and heating said shaped article thereby crosslinking the anionic polyelectrolyte polymer through said epoxy groups and insolubilizing said polymer.

The polymers employed in the preparation of the blends of this invention are, for one component, water-soluble linear polyanionic polymers containing epoxy groups, and, for the other component, water-insoluble but water-dispersible linear non-electrolyte film-forming addition polymers of a polymerizable ethylenically unsaturated monomer having a terminal carbon-to-carbon double bond. With respect to the former, many linear polymers containing a plurality of anionic (acidic) groups, e. g., carboxyl, sulfonic or phosphoric groups, have been described. Epoxy groups can be introduced in these polymers in any suitable manner, for example, by copolymerizing unsaturated acidic monomers with polymerizable epoxy-containing monomers, or by reacting a portion of the acidic groups of the preformed polyelectrolyte polymer with a reagent which introduces epoxy groups. For the purpose of this invention, the polyanionic polymer is often, and in fact preferably, used as its ammonium or alkali metal (e. g., sodium or potassium) salt, since such salts are more water-soluble than the free acids.

It is highly important that the polyanionic polymer contain at least 0.2 acid group (e. g., carboxyl, sulfonic or phosphoric groups) per 100 molecular weight since it has been found that at least this amount is necessary, first, to make the polymer water-soluble and, second, to make the resultant crosslinked product more permeable to water vapor. Preferably, the polyanionic polymer contains between 0.25 and 1.0 acid group per 100 molecular weight. It is also highly important that the molar ratio of acid to epoxy groups in the polymer be at least 1:1, and preferably between 2:1 and 10:1, in order to insure complete crosslinking of the epoxy group. The polyelectrolyte polymers can contain very small amounts of epoxy groups, as low as 0.005 epoxy group per 100 molecular weight, but preferably they contain between 0.02 and 0.5 epoxy groups per 100 molecular weight. The molecular weight of the epoxy-containing polyanionic polymer should be in excess of 1000, and preferably in the range of 1500 to 100,000, although it can be as high as 500,000 or even higher. The polymer should be soluble in water, at least to the extent of 1% and preferably to the extent of at least 2%.

The other component of the polymeric blends of this invention is a water-insoluble, but water-dispersible non-ionic film-forming addition polymer of a polymerizable ethylenically unsaturated monomer having a terminal carbon-to-carbon double bond. A large number of such polymers are known. For best results, the non-electrolyte polymer should have a molecular weight of at least 1000, and preferably in the range of 1500 to 500,000, although polymers of even much higher molecular weight can be used. The non-electrolyte polymer and the epoxy-containing polyelectrolyte polymer should be employed in such proportions that the final polymer blend contains a weight ratio of non-electrolyte polymer to polyelectrolyte polymer within the range of 50:50 to 97:3. It is within this range that the desired combination of dimensional stability, pliability and toughness with moisture permeability is found.

When the aqueous dispersion of non-electrolyte polymer is prepared with the help of a dispersing agent, it is desirable that the latter be of the anionic or non-ionic type, since a polymer dispersed in a cationic system tends to flocculate, at least partly, when it comes in contact with the solution of the anionic polymer. The principal reason for this fact is that the surface charge of the dispersed polymer particles is neutralized or diminished by the introduction into the system of the polyelectrolyte of opposite charge, although it is also possible that other colloidal phenomena play a part. It is well known that the particles of an aqueous polymer dispersion have a superficial electrostatic charge, which is particularly appreciable when the dispersion is prepared with the help of an ionogenic (cationic or anionic) surface-active agent (see, for example, the discussion at pages 121–124 of "Surface Activity," by Moilliet and Collie, E. and F. N. Spon, Ltd., London, 1951). Thus, when the particles in the aqueous dispersions of the non-electrolyte polymers have a surface charge, the latter should be negative to avoid precipitation when the two aqueous systems come in contact.

When this precaution is observed, there is obtained by mixing the aqueous solution of the polymeric polyelectrolyte and the aqueous dispersion of the non-electrolyte polymer a stable, non-flocculated aqueous system which can be formed into shaped structures, such as filaments or films, by suitable methods such as extrusion or deposition on a support, and evaporation of the water. Simultaneously or subsequently, the polymeric blend is heated to a temperature sufficient to cause crosslinking by the epoxy groups and insolubilize the blend. This heating can be at a very moderate temperature, e. g., 25–50° C., but it then requires a long period of time, e. g., from one to three days or more. Preferably it is carried out at temperatures in excess of 50° C., preferably between 60 and 200° C. The blend so obtained retains the moisture permeability of the polymeric polyelectrolyte, but it acquires the advantages of toughness, pliability and dimensional stability of the non-electrolyte polymer.

The invention is illustrated in greater detail in the following examples.

*Example I*

One hundred milliliters of a 10% by weight aqueous solution of polyacrylic acid was titrated with 1.0 N aqueous sodium hydroxide solution to a pH of 7.1. This required 110 ml. of the sodium hydroxide solution. To this solution was added sufficient epichlorohydrin (2.5 g.) to react with about one-fifth of the sodium carboxylate groups, and the mixture was stirred at room temperature for five hours. This treatment serves to introduce in the polymer a number of carboglycidyloxy groups,

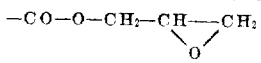

for the purpose of subsequently creating covalent crosslinkages. Assuming complete reaction, the resulting polymer contained about 0.79 sodium carboxylate groups per 100 molecular weight, with a ratio of sodium carboxylate groups to epoxy groups of 4:1.

Fifty milliliters of the resulting clear solution was added slowly to 50 ml. of a polychloroprene latex containing 50.2% solids and prepared by polymerizing chloroprene in the presence of an anionic dispersing agent, sodium rosinate. The resulting dispersion was cast onto a glass plate and spread with a doctor knife set at 35 mil clearance. After air-drying, the resulting film was fairly tough and quite elastic. The ratio of non-electrolyte polymer to polyelectrolyte polymer in the blend was about 89:11.

A portion of this film was heated at 70° C. for 30 minutes in a Carver press. This treatment resulted in crosslinking of the epoxy-containing sodium polyacrylate, as shown by the fact that no sodium polyacrylate could be leached with water from the film after the heat treatment. The film had definite ion-exchange properties, as shown by its ability to screen hydroxyl ions. It was permeable to water vapor, as shown by its leather permeability value of 1000.

In this and other examples, the leather permeability data are in units of grams of water per 100 square meters per hour. They were obtained in tests carried out according to a modification of the method of Kanagy and Vickers (Journal of American Leather Chemical Association 45, 211–242, April 1950). In the modification of this test used here, an approximately 3-inch diameter crystallizing dish is filled with 12-mesh calcium chloride and covered (using tight, non-permeable seals at the edges) with a sample of the film under test, and then suspended inverted in an atmosphere of high humidity (90% relative humidity at 23° C. or, in some cases, at higher temperatures). The equilibrium rate of water absorption by the calcium chloride is obtained by weighing the assembly at suitable intervals, and the results are noted in the units given above. In general, under these conditions, shoe-upper leathers exhibit leather permeability values within the range 2000–18,000 gms./100 m.²/hr.

*Example II*

Twenty-five milliliters of a commercial polyacrylic low alkyl ester aqueous dispersion containing 40% solids and prepared with a non-ionic dispersing agent was diluted with 25 ml. of distilled water. To this dispersion was added slowly with stirring 12 ml. of a 16.7% aqueous solution of sodium polystyrene sulfonate, prepared according to the procedure of U. S. Patent 2,533,210. To the mixture was then added slowly with thorough mixing the amount of epichlorohydrin (0.33 g.) theoretically sufficient to react with about 37% of the sodium sulfonate groups to form glycidyl sulfonate groups. On this basis, the resulting polyelectrolyte polymer contained about 0.29 sodium sulfonate group per 100 molecular weight and the ratio of sodium sulfonate to epoxy groups was about 1.7:1. The ratio of non-electrolyte polymer to polymeric polyelectrolyte was about 82:18. The resulting dispersion was spread onto a glass plate with a doctor knife set at 25 mils clearance.

After drying at room temperature overnight, the film was baked at 80° C. for 6 hours to introduce covalent crosslinkages. The resulting white film was placed on a piece of polyester (polyethyleneterephthalate) fabric (marquisette weave) and pressed at 150° C. for 5 minutes in a Carver press. The coated fabric so obtained had definite ion-exchange properties, as shown by its ability to screen chloride ions.

Example III

Twenty-five milliliters of the polyacrylic ester emulsion of Example II was diluted with 40 ml. of distilled water and to this dispersion was added 31 ml. of the aqueous sodium polystyrene sulfonate solution of Example II. To the viscous mixture was added with stirring the amount of epichlorohydrin (0.55 g.) theoretically sufficient to react with about 23% of the sodium sulfonate groups. The polyelectrolyte polymer contained about 0.39 sodium sulfonate group per 100 molecular weight and had a ratio of sodium sulfonate to epoxy group of about 3.3:1. The ratio of non-electrolyte polymer to polymeric polyelectrolyte was about 65:35. The resulting dispersion was spread on a glass plate with a doctor knife set at 35 mils clearance.

After air-drying, the assembly was baked at 80° C. for 5 minutes to yield a white, tough film. A portion of the latter was pressed at 130° C. for 15 minutes under 1500 lbs. total pressure in a Carver press. There was thus obtained a film of 13.9 mils thickness which had a leather permeability value of 1800.

Example IV

To 105 ml. of an aqueous solution containing 5.44 g. of sodium polymethacrylate was added with stirring and external ice cooling the amount of epichlorohydrin (1.1 g.) calculated to react with about 24% of the sodium carboxylate groups. After 1½ hours, the external cooling was removed and the stirring was continued for an additional 2 hours at room temperature. The resulting polyelectrolyte polymer contained about 0.65 sodium carboxylate group per 100 molecular weight and has a ratio of sodium carboxylate to epoxy groups of about 3.2:1. Thirty milliliters of the resulting solution was added slowly with stirring to 30 ml. of a dioctyl phthalate-plasticized polyvinyl chloride aqueous emulsion containing 55.2% solids and prepared with an anionic dispersing agent. The resulting dispersion, in which the ratio of nonelectrolyte polymer to polymeric polyelectrolyte was about 91:9, was cast onto a glass plate to form a film 15 mils in thickness.

After air-drying, a portion of the film was baked at 130° C. for one hour and a second portion of the film was pressed at 130° C. for 15 minutes at 10,000 lbs. total pressure in a Carver press. By thorough leaching with distilled water none of the polyelectrolyte polymer could be extracted from either film.

In contrast, sodium polymethacrylate could be extracted with water from a film prepared from a similar blend of polyvinyl chloride emulsion and sodium polymethacrylate solution unmodified by treatment with epichlorohydrin and thus containing no epoxy groups.

Example V

To 50 g. of the dioctyl phthalate-plasticized polyvinyl chloride aqueous emulsion of Example IV was added 6 g. of a 50% solids dispersion of a brown iron oxide pigment in water and 20 g. of a 12% aqueous solution of sodium polymethacrylate which had been reacted with epichlorohydrin in 83:17 molar ratio. The polyelectrolyte polymer contained about 0.7 sodium carboxylate group per 100 molecular weight, with a ratio of sodium carboxylate to epoxy groups of about 4:1. The ratio of polymeric non-electrolyte to polymeric polyelectrolyte was about 91:9. The resulting mixture, which was stable without coagulation for at least 72 hours, was sprayed onto aluminum foil, dried and then laminated foil side up by pressing at 149° C. to a non-woven polyamide fabric which had been previously impregnated with an aqueous emulsion of dioctyl phthalate-plasticized polyvinyl chloride. The foil side of the topcoated mat was then embossed by pressing at 149° C. The foil was then removed to leave a film topcoat, containing the blend of non-electrolyte polymer and covalently crosslinked polyelectrolyte polymer, which was 1.5 mils in thickness. The topcoated polyamide fiber web had a leather permeability value of 7700 at 32° C. and 90% relative humidity.

Example VI

Fifty-six grams of a polychloroprene latex containing 35% solids and prepared by polymerizing chloroprene in the presence of an anionic dispersing agent, sodium rosinate, was mixed with 13.5 g. of an emulsified mixture of curing and dispersing agents consisting of 1.0 g. of partially desulfonated sodium lignin sulfonate, 1.0 g. of sulfur, 0.5 g. of 2-mercaptothiazoline, 15 g. of zinc oxide and 50 g. of water. To the resulting polychloroprene dispersion was added 5 g. of a 10% aqueous solution of a non-ionic dispersing agent, octylphenyl polyglycol ether, and 16.6 g. of a solution prepared by the addition of 2.84 g. of epichlorohydrin to 167 g. of a 12% aqueous solution of sodium polymethacrylate. The polyelectrolyte polymer contained about 0.74 sodium carboxylate group per 100 molecular weight and had a ratio of sodium carboxylate to epoxy groups of about 5.2:1. The ratio of non-electrolyte polymer to polymeric polyelectrolyte was about 90:10.

Thin films cast from the resulting mixture were baked for 4 hours at 127° C., then removed from the glass plates on which they had been cast by soaking in water. A film so prepared and having a thickness of 3.5 mils. had a leather permeability value of 6400 at 32° C. and 93% relative humidity. This film showed no failure after 1.5 million flexes on a Schiltknecht testing machine.

Another film was prepared in the same manner except that the epichlorohydrin was omitted, and thus the polyelectrolyte polymer had no crosslinkable groups. When this film was removed from the plate upon which it had been cast without water treatment, it had a leather permeability value of 6000. However, after being immersed in water, the leather permeability value dropped to 800, showing that the sodium polymethacrylate had been leached from this film by the water treatment.

The Schiltknecht flex-life value mentioned above refers to the number of flexes the films undergo when flexed at 23° C. and 50% relative humidity in the Schiltknecht flex machine (Bulletin No. 105 of Alfred Suter Co., 200 Fifth Avenue, New York, N. Y.). These values represent a measure of the toughness of the material under constant flex, and as regards resistance to flexing they represent an accelerated wear test. The higher the value reported in this test, the more resistant is the material to failure caused by flexing.

The following example illustrates the preparation of fibers from the polymeric blends of this invention.

Example VII

Four hundred milliliters of epichlorohydrin-modified sodium polyacrylate solution prepared according to the procedure outlined in Example I was added with stirring to 250 ml. of a latex of dioctyl phthalate-plasticized polyvinyl chloride containing 55.2% solids and prepared with an anionic dispersing agent. The ratio of non-electrolyte polymer to polymeric polyelectrolyte was about 85:15. This mixture was spread onto glass plates and allowed to air dry.

A portion of the resulting film was placed in a cylindrical press connected to a ⅛-inch aperture. The press was heated to 160° C. and pressure was applied (40 pounds total pressure) to eject a thin filament of the polymeric blend. This filament exhibited hydrophilic properties and showed improved resistance to static electricity buildup when compared with a fiber of an unmodified plasticized polyvinyl chloride.

The following example illustrates the aftertreatment of the polymeric blends of this invention with inorganic salts.

*Example VIII*

Four hundred milliliters of epichlorohydrin-modified sodium polyacrylate solution prepared according to the procedure outlined in Example I was added with stirring to 250 ml. of a latex of dioctyl phthalate-plasticized polyvinyl chloride containing 55.2% solids and prepared with an anionic dispersing agent. The ratio of non-electrolyte polymer of polymeric polyelectrolyte was about 85:15. This mixture was cast onto a glass plate and spread with a doctor knife set to 40 mils. After air-drying, the film which formed was removed from the glass and then pressed at 10,000 pounds total pressure at 130° C. for 10 minutes in a Carver press. The resulting hydrophilic, tough, translucent film was divided into small portions.

One portion of the film was immersed in a 10% aqueous solution of calcium chloride for 28 hours. The resulting film had a rougher hand and was slightly less pliable than the untreated film. This calcium chloride-treated film was less water-sensitive than the untreated material.

Another portion of the film was treated with a 10% solution of lithium nitrate. Analysis indicated that the sodium was ion-exchanged for the lithium, and the resulting film was very similar in properties to the untreated sodium polyacrylate-containing blend.

The polyelectrolyte polymers suitable for use in the practice of this invention include any polymer containing both acidic (anionic) groups, or salts thereof, and 1,2-epoxy groups, in which the molar ratio of acidic (anionic) groups to epoxy groups is at least 1:1 and in which there are at least 0.2 acidic (anionic) group per 100 molecular weight. These polymers can be prepared in certain cases by copolymerizing unsaturated acidic monomers, e. g., methacrylic acid, with unsaturated epoxy monomers, e. g., glycidyl methacrylate. Such systems crosslink extremely fast. In general, it is more convenient to introduce epoxy groups in a polyanionic polymer, for example, by partially esterifying polybasic polymeric acids, or ester-forming derivatives thereof, with epoxy-alcohols or ester-forming derivatives thereof.

Suitable polybasic polymeric acids include, for example, polyacrylic acid, polymethacrylic acid, polyethacrylic acid, poly-alpha-chloroacrylic acid, and the like; the interpolymers of monocarboxylic acids of the acrylic series with polymerizable vinylidene compounds, for example, the copolymers of methacrylic acid with methyl methacrylate, vinyl acetate, styrene or 1,3-butadiene, or the copolymers of acrylic acid with acrylonitrile; the hydrolyzed copolymers of alpha,beta-ethylenically unsaturated dicarboxylic acid anhydrides such as maleic anhydride with polymerizable vinylidene compounds such as ethylene, propylene, isobutylene, styrene, methylvinyl ether, vinyl acetate, vinyl chloride, ethyl acrylate, and the like; the polysulfonic acids such as polyvinylsulfonic acid, polyvinylbenzenesulfonic acids, polyvinylnaphthalenesulfonic acids; the polymeric acids obtained by reacting phosphoric acid with polyvinyl alcohol or the hydrolyzed ethylene/vinyl acetate copolymers; the naturally occurring polymers containing a plurality of acidic groups, such as lignic acid, alginic acid, carboxymethylcellulose; and the like. These polymeric acids, or their ammonium or alkali metal salts, can be partially esterified with epoxy-alcohols or the corresponding halogen derivatives.

Suitable epoxy-alcohols include, for example 2,3-epoxypropanol, 5,6-epoxyhexanol-2, beta-hydroxyethyl ethylene oxide, 3,4-epoxy-2,2,4-trimethylpentanol-3, epoxydodecanol, epoxyoctadecanol, 3-hydroxy-1,2-epoxycyclohexane, alpha-hydroxymethyl-alpha-phenylethylene oxide, and the like. In general, the most convenient way of preparing the partial epoxy-alcohol esters of the polymeric acids is to react the sodium salt of the latter with chloroepoxy compound, e. g., the chloroepoxy compounds corresponding to the hydroxyepoxy compounds listed above. Epichlorohydrin is particularly preferred since it is the most economical material with which epoxy groups can be introduced.

The preferred epoxy-containing polyelectrolye polymers for use in the practice of this invention are those obtained by partial reaction of epichlorohydrin with the polymers of aliphatic monocarboxylic acids having a methylene ($CH_2=$) group attached by an ethylenic double bond to a carbon atom alpha to the carboxylic acid group; and in particular the polymers of acrylic and alpha-methacrylic acid.

As regards the second component of these polymer blends, viz., the non-electrolyte polymer there can be used any addition polymer of a polymerizable ethylenically unsaturated monomer having a terminal carbon-to-carbon double bond which is insoluble in water but dispersible therein. These polymerizable ethylenically unsaturated monomers having a terminal carbon-to-carbon double bond are represented by the general formula

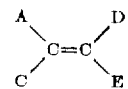

where A and B are hydrogen or halogen (fluorine, chlorine, bromine and iodine) and D and E are hydrogen, halogen, hydrocarbon radicals (e. g., alkyl, alkenyl, cycloalkyl, cycloalkenyl, aryl, aralkyl, aralkenyl), haloalkenyl, cyano, carbalkoxy, acyloxy, aldehyde, ketone, amido, imido, ether, acetal groups and the like. Still more preferred are the polymers and copolymers in which A and B in the above general formula are both hydrogen, i. e., the polymers and copolymers of ethylenic monomers having a terminal methylene group (vinyl and vinylidene monomers).

Examples of suitable specific materials are the polymers and copolymers of vinyl halides (vinyl fluoride, chloride, bromide and iodide); vinylidene halides such as 1,1-difluoroethylene and 1,1-dichloroethylene; 1,1-dichloro-2,2-difluoroethylene, tetrafluoroethylene, trifluorochloroethylene; vinyl and vinylidene hydrocarbons such as ethylene, propylene, isobutylene, 1,3-butadiene, isoprene, vinylcyclohexane, styrene, vinylnaphthalene, 2-phenyl-1,3-butadiene; halovinyl and halovinylidene hydrocarbons such as 2-fluoro-1,3-butadiene, 2-chloro-1,3-butadiene, 2,3-dichloro-1,3-butadiene, 2-iodo-1,3-butadiene; acrylyl and alkacrylyl compounds, e. g., acrylic, haloacrylic and alkacrylic esters, nitriles and amides, for example, ethyl acrylate, methyl methacrylate, butyl methacrylate, methoxymethyl methacrylate, chloroethyl methacrylate, acrylonitrile, methacrylonitrile, acrylamide, methacrylamide; vinyl carboxylates such as vinyl formate, vinyl acetate, vinyl chloroacetate, vinyl butyrate, vinyl laurate; vinyl acetals such as vinyl butyral; unsaturated aldehydes and ketones, such as acrolein, methacrolein, methyl vinyl ketone; N-vinyl imides such as N-vinylphthalimide, N-vinylsuccinimide; unsaturated ethers such as vinyl ethyl ether, vinyl isobutyl ether, 2-phenoxy-1,3-butadiene; and other vinyl monomers such as N-vinylcaprolactam, N-vinylbutyrolactam, and the like, and other unsaturates which, while not readily polymerizable per se, are capable of forming copolymers, such as dimethyl and diethyl fumarate, dimethyl and diethyl maleate, and the like.

In some instances, additional desirable properties are imparted to the polymer blends of this invention by an aftertreatment with salts of polyvalent cations or of polyvalent anions, such as barium chloride, calcium chloride, magnesium chloride, tin tetrachloride, aluminum chloride, cadmium acetate, lead nitrate, mercuric chloride, zinc chloride, nickel diacetate, aluminum potassium sulfate, basic chromium sulfate, sodium silicate, sodium cobaltinitrite, sodium chloroplatinate and the like. Such a treatment reduces the tack of the wet compositions, gives stiffer products and serves to vary the texture of the films, e. g., to give them a rougher feel.

The crosslinked polymer blends of this invention are particularly useful in the form of self-supporting film suitable for packaging, and of supported film in the coating of porous materials such as textile fabrics. Their stability, hydrophilic nature and high degree of moisture permeability make them highly useful as substitutes for leather and in many other fields such as hydrophilic fibers, which can be made, for example, by extruding a suitable blend through a spinneret, if necessary with heating to soften the polymer blend.

Fabrics coated or impregnated with these polymer blends show excellent anti-static properties. The polymer blends are particularly useful as impregnants for nonwoven webs of natural or synthetic fibers. The resulting laminated fabrics have a leather-like texture; they are impermeable to liquid water but highly permeable to water vapor.

These polymer blends, after crosslinking, can also be used as ion-exchange membranes, leather finishes, food wrappings, semi-conducting sheetings, electrical potting compounds, fuel-resistant gaskets or diaphragms, and the like. The blends can also be shaped in the form of monofils or of fine fibers, which can be used to make fabrics or non-woven webs.

As many apparently widely different embodiments of this invention may be made without departing from the spirit and scope thereof, it is to be understood that this invention is not limited to the specific embodiments thereof except as defined in the appended claims.

I claim:

1. A polymer blend comprising (a) a water-insoluble, water-dispersible, non-electrolyte film-forming addition polymer of a polymerizable ethylenically unsaturated monomer having a terminal carbon-to-carbon double bond and (b) a water-soluble, anionic polyelectrolyte polymer containing 1,2-epoxy groups and acidic groups selected solely from the class consisting of carboxyl, sulfonic and phosphoric acid groups, and their alkali metal and ammonium salt groups, said anionic polyelectrolyte polymer containing at least 0.2 acidic group per 100 molecular weight with the molar ratio of acidic to epoxy groups being at least 1:1, and said polymer blend containing a weight ratio of non-electrolyte polymer to polyelectrolyte polymer within the range of 50:50 to 97:3.

2. A polymer blend comprising (a) a water-insoluble, water-dispersible, non-electrolyte film-forming addition polymer of a polymerizable ethylenically unsaturated monomer having a terminal methylene group and (b) a water-soluble, anionic polyelectrolyte polymer containing 1,2-epoxy groups and acidic groups consisting solely of alkali metal carboxylate groups, said anionic polyelectrolyte polymer containing at least 0.2 acidic group per 100 molecular weight with the molar ratio of acidic to epoxy groups being at least 1:1, and said polymer blend containing a weight ratio of non-electrolyte polymer to polyelectrolyte polymer within the range of 50:50 to 97:3.

3. A polymer blend comprising (a) a water-insoluble, water-dispersible, non-electrolyte film-forming addition polymer of a polymerizable ethylenically unsaturated halohydrocarbon having a terminal methylene group and (b) a water-soluble, anionic polyelectrolyte polymer which is the product obtained by partially reacting a polymer of an aliphatic alpha,beta-ethylenically unsaturated alkali metal monocarboxylate with epichlorohydrin, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer within the range of 50:50 to 97:3.

4. A polymer blend comprising (a) a water-insoluble, water-dispersible, non-electrolyte film-forming polymer of vinyl chloride and (b) a water-soluble, anionic polyelectrolyte polymer which is the product obtained by partially reacting sodium polyacrylate with epichlorohydrin, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3.

5. A polymer blend comprising a water-insoluble, water-dispersible, non-electrolyte film-forming polymer of vinyl chloride and a water-soluble, anionic polyelectrolyte polymer which is the product obtained by partially reacting sodium polymethacrylate with epichlorohydrin, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3.

6. A polymer blend comprising a water-insoluble, water-dispersible, non-electrolyte film-forming polymer of chloroprene and a water-soluble, anionic polyelectrolyte polymer which is the product obtained by partially reacting sodium polyacrylate with epichlorohydrin, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3.

7. A polymer blend comprising a water-insoluble, water-dispersible, non-electrolyte film-forming polymer of chloroprene and a water-soluble, anionic polyelectrolyte polymer which is the product obtained by partially reacting sodium polymethacrylate with epichlorohydrin, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3.

8. A polymer blend comprising a water-insoluble, water-dispersible, non-electrolyte film-forming polymer of an acrylic lower alkyl ester and a water-soluble, anionic polyelectrolyte polymer which is the product obtained by partially reacting sodium polystyrene sulfonate with epichlorohydrin, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3.

9. A fabric coated with the polymer blend set forth in claim 1.

10. A non-woven fabric coated with the polymer blend set forth in claim 1.

11. A woven fabric coated with the polymer blend set forth in claim 1.

12. A process for preparing shaped articles which comprises dissolving a water-soluble, anionic polyelectrolyte polymer containing 1,2-epoxy groups and acidic groups selected solely from the class consisting of carboxyl, sulfonic and phosphoric acid groups, and their alkali metal and ammonium salt groups in an aqueous dispersion of a water-insoluble, water-dispersible, non-electrolyte film-forming addition polymer of a polymerizable ethylenically unsaturated monomer having a terminal carbon-tocarbon double bond thereby producing a polymer blend, said anionic polyelectrolyte polymer containing at least 0.2 acidic group per 100 molecular weight with the molar ratio of acidic to epoxy groups being at least 1:1, and said polymer blend containing a weight ratio of non-electrolyte polymer to polyelectrolyte polymer within the range of 50:50 to 97:3, forming the resultant polymer blend into a shaped article, and heating said shaped article thereby cross-linking the anionic polyelectrolyte polymer through said epoxy groups.

13. A process for preparing shaped articles which comprises dissolving a water-soluble, anionic polyelectrolyte polymer containing, 1,2-epoxy groups and acidic groups consisting solely of alkali metal carboxylate groups in an aqueous dispersion of a water-insoluble, water-dispersible, non-electrolyte film-forming addition polymer of a polymerizable ethylenically unsaturated monomer having a terminal methylene group thereby producing a polymer blend, said anionic polyelectrolyte polymer containing at least 0.2 acidic group per 100 molecular weight with the molar ratio of acidic to epoxy groups being at least 1:1, and said polymer blend containing a weight ratio of non-electrolyte polymer to polyelectrolyte polymer within the range of 50:50 to 97:3, forming the resultant polymer blend into a shaped article, and heating said shaped article thereby cross-linking the anionic polyelectrolyte polymer through said epoxy groups.

14. A process for preparing shaped articles which comprises dissolving a water-soluble, anionic polyelectrolyte polymer, which is the product obtained by partially reacting a polymer of an aliphatic alpha,beta-ethylenically unsaturated alkali metal monocarboxylic with epichlorohydrin, in an aqueous dispersion of a water-insoluble, water-dispersible, non-electrolyte film-forming addition polymer of a polymerizable ethylenically unsaturated halohydrocarbon having a terminal methylene group thereby producing a polymer blend, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3, forming the resultant polymer blend into a shaped article, and heating said shaped article thereby cross-linking the anionic polyelectrolyte polymer through said epoxy groups.

15. A process for preparing shaped articles which comprises dissolving a water-soluble, anionic polyelectrolyte polymer, which is the product obtained by partially reacting sodium polyacrylate with epichlorohydrin, in an aqueous dispersion of a water-insoluble, water-dispersible, non-electrolyte film-forming polymer of vinyl chloride thereby producing a polymer blend, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3, forming the resultant polymer blend into a shaped article, and heating said shaped article thereby cross-linking the anionic polyelectrolyte polymer through said epoxy groups.

16. A process for preparing shaped articles which comprises dissolving a water-soluble, anionic polyelectrolyte polymer, which is the product obtained by partially reacting sodium polymethacrylate with epichlorohydrin, in an aqueous dispersion of a water-insoluble, water-dispersible, non-electrolyte film-forming polymer of vinyl chloride thereby producing a polymer blend, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3, forming the resultant polymer blend into a shaped article, and heating said shaped article thereby cross-linking the anionic polyelectrolyte polymer through said epoxy groups.

17. A process for preparing shaped articles which comprises dissolving a water-soluble, anionic polyelectrolyte polymer, which is the product obtained by partially reacting sodium polyacrylate with epichlorohydrin, in an aqueous dispersion of a water-insoluble, water-dispersible, non-electrolyte film-forming polymer of chloroprene thereby producing a polymer blend, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3, forming the resultant polymer blend into a shaped article, and heating said shaped article thereby cross-linking the anionic polyelectrolyte polymer through said epoxy groups.

18. A process for preparing shaped articles which comprises dissolving a water-soluble, anionic polyelectrolyte polymer, which is the product obtained by partially reacting sodium polymethacrylate with epichlorohydrin, in an aqueous dispersion of a water-insoluble, water-dispersible, non-electrolyte film-forming polymer of chloroprene thereby producing a polymer blend, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3, forming the resultant polymer blend into a shaped article, and heating said shaped article thereby cross-linking the anionic polyelectrolyte polymer through said epoxy groups.

19. A process for preparing shaped articles which comprises dissolving a water-soluble, anionic polyelectrolyte polymer, which is the product obtained by partially reacting sodium polystyrene sulfonate with epichlorohydrin, in an aqueous dispersion of a water-insoluble, water-dispersible, non-electrolyte film-forming polymer of an acrylic lower alkyl ester thereby producing a polymer blend, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3, forming the resultant polymer blend into a shaped article, and heating said shaped article thereby cross-linking the anionic polyelectrolyte polymer through said epoxy groups.

20. A polymer blend comprising (a) a water-insoluble, water-dispersible, non-electrolyte film-forming addition polymer of a polymerizable ethylenically unsaturated monomer having a terminal carbon-to-carbon double bond, and (b) a water-soluble, anionic polyelectrolyte polymer which is the product obtained by partially reacting a polymer of an aliphatic alpha,beta-ethylenically unsaturated alkali metal monocarboxylate with epichlorohydrin, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3.

21. A process for preparing shaped articles which comprises dissolving a water-soluble, anionic polyelectrolyte polymer, which is the product obtained by partially reacting a polymer of an aliphatic alpha,beta-ethylenically unsaturated alkali metal monocarboxylate with epichlorohydrin, in an aqueous dispersion of a water-insoluble, water-dispersible, non-electrolyte film-forming addition polymer of a polymerizable ethylenically unsaturated monomer having a terminal carbon-to-carbon double bond thereby producing a polymer blend, said anionic polyelectrolyte polymer containing at least 0.2 acidic group per 100 molecular weight and also containing epoxy groups with the molar ratio of acidic to epoxy groups being at least 1:1, and said polymer blend containing a weight ratio of non-electrolyte polymer to polyelectrolyte polymer within the range of 50:50 to 97:3, forming the resulting polymer blend into a shaped article, and heating said shaped article thereby cross-linking the anionic polyelectrolyte polymer through said epoxy groups.

References Cited in the file of this patent

UNITED STATES PATENTS

| | | |
|---|---|---|
| 2,510,885 | Greenlee | June 6, 1950 |
| 2,558,949 | Greenlee | July 3, 1951 |
| 2,607,754 | Ellingboe et al. | Aug. 19, 1952 |
| 2,723,971 | Cupery | Nov. 15, 1955 |

OTHER REFERENCES

Shell: "Epon Resins," article in Paint, Oil, and Chemical Review, November 9, 1950.

UNITED STATES PATENT OFFICE

CERTIFICATE OF CORRECTION

Patent No. 2,794,010

May 28, 1957

Harold L. Jackson

It is hereby certified that error appears in the printed specification of the above numbered patent requiring correction and that the said Letters Patent should read as corrected below.

Column 5, line 43, for "has a ratio" read -- had a ratio --; column 7, line 17, for "polymer of" read -- polymer to --; column 10, line 2, before "within" insert -- to polyelectrolyte polymer --; column 11, line 32, for "monocarboxylic" read -- monocarboxylate --.

Signed and sealed this 3rd day of September 1957.

(SEAL)
Attest:
KARL H. AXLINE

Attesting Officer

ROBERT C. WATSON
Commissioner of Patents